Figure 1:
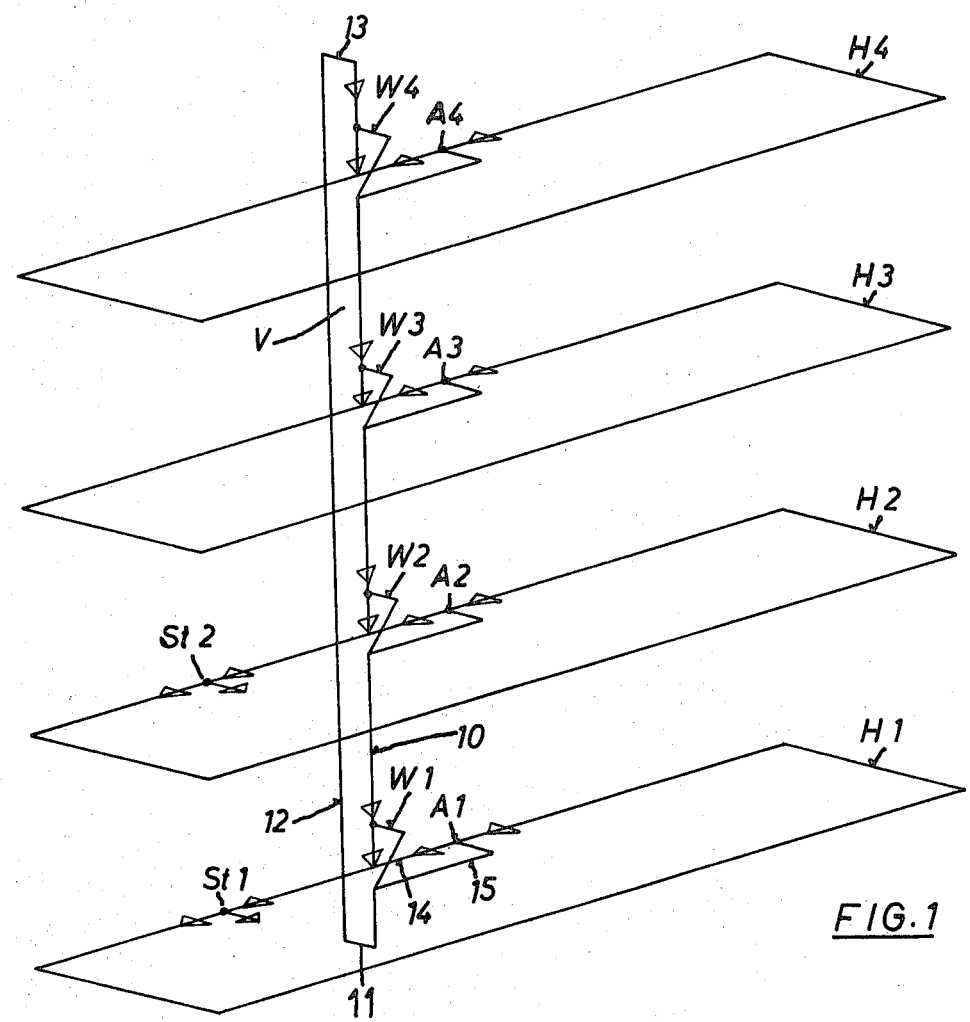

United States Patent [19]
Schneider

[11] 3,799,323
[45] Mar. 26, 1974

[54] CONVEYOR ASSEMBLY FOR TRANSPORTING CONVEYOR CONTAINERS ALONG HORIZONTAL AND VERTICAL CONVEYOR PATHS

[76] Inventor: Erich Schneider, Postfach 46, 7346 Wiesensteig, Germany

[22] Filed: July 7, 1972

[21] Appl. No.: 269,749

[30] Foreign Application Priority Data
July 9, 1971 Germany............................ 2134264

[52] U.S. Cl. ................................................. 198/38
[51] Int. Cl. ........................................... B65g 43/08
[58] Field of Search...................... 198/38; 214/11 R

[56] References Cited
UNITED STATES PATENTS
3,602,359  8/1971  Miya et al............................ 198/38
3,612,249  10/1971  Schneider............................ 198/38

Primary Examiner—Edward A. Sroka
Attorney, Agent, or Firm—Eugene M. Eckelman

[57] ABSTRACT

A belt conveyor for transporting containers from one destination to another in a multiple deck installation. The multiple decks have horizontal conveyors, and these conveyors are associated with a single vertical conveyor employing twin belts between which the container is held and transported. Container transfer means are provided at the intersection of the horizontal conveyors and the vertical conveyor and are arranged by suitable control thereof to move a container directly from one deck to another.

4 Claims, 2 Drawing Figures

CONVEYOR ASSEMBLY FOR TRANSPORTING CONVEYOR CONTAINERS ALONG HORIZONTAL AND VERTICAL CONVEYOR PATHS

The invention relates to a device in belt conveyor installations for transporting transport containers provided with destination addresses along horizontal and vertical paths.

Transport containers, which are generally open at the top and intended for documentary material, are entrained along vertical upward and downward paths between endless conveyor belts running parallel and in the same direction, whereas along horizontal conveyor paths they stand on edge between channel walls. It is then possible for a forward path and a return path to be arranged in juxtaposed position divided between two channels, although only one channel may be used.

In known installations of the type referred to, which connect a plurality of horizontal paths together by a vertical path, the locking in of conveyor containers into the horizontal paths from the vertical path can occur only from above downwards i.e., along the downward path. The upward path admits of no branching positions.

The disadvantage of such installations is that considerable detours must be made when a container is required to be transported, say, from a lower lying deck of the installation into a higher deck. In this case, first of all the container has to travel along the remaining section of the downward path of the vertical path as far as its bottom reversal point, and then must travel through all the horizontal paths branching off along this road, whereupon it is necessary to travel the entire upward path as far as the top reversal position of the vertical path and then the downward path with at least all the horizontal paths which branch off in front of the horizontal path intended for locking in.

It is a source of further difficulty that at each transfer of a transport container from a horizontal path to the downward path and vice versa the endless double belts of the vertical path, between which the conveyor contained is intended to be guided, are mutually separated through rollers in order to enable the conveyor container to be received or transferred.

Installations of this type therefore necessitate a considerable amount of idle travel and are subject to heavy stress which at least considerably reduces their efficiency, and may even render it dubious.

A primary objective of the invention is to eliminate the said disadvantages by simple means while creating a direct selective diversion between vertical and horizontal paths. This is achieved according to the invention, in that there is provided in the intersection region of horizontal and vertical paths a point or station having two mutually intersecting passages for the two paths, and also an additional branch inlet to the horizontal path, a points tongue controlled by the destination address selectively permitting the continuation of the conveyor containers along their vertical or horizontal inlet and passage path or else the direct diversion of the same from the vertical to the horizontal path and vice versa.

The detailed constitution of the device may be such that in the intersection region of a horizontal and a vertical path, and namely preferably in each such intersection region of a multiple-deck installation, an intersection point is provided having the two mutually intersecting passages and also, in front thereof, a customary point is provided for the additional branch inlet to the horizontal path.

As a further object of the invention, the intersection points may be so contrived that in the switching position to continuation of the material along the vertical and/or horizontal inlet and passage path, it makes possible the simultaneous transport of the material along the vertical path and along the horizontal path within the intersection position.

It is furthermore useful to contrive the intersection points in such a way that in the switching position for diversion of the material from the vertical to the horizontal path and vice versa, it makes possible the simultaneous transfer of material from the vertical path into the horizontal path and from the additional branch inlet of the horizontal path to the vertical path.

Lastly it is an object to provide all the conveyor paths in front of their entry into a points region with a scanning head for the destination addresses of the conveyor containers.

Figure 2:
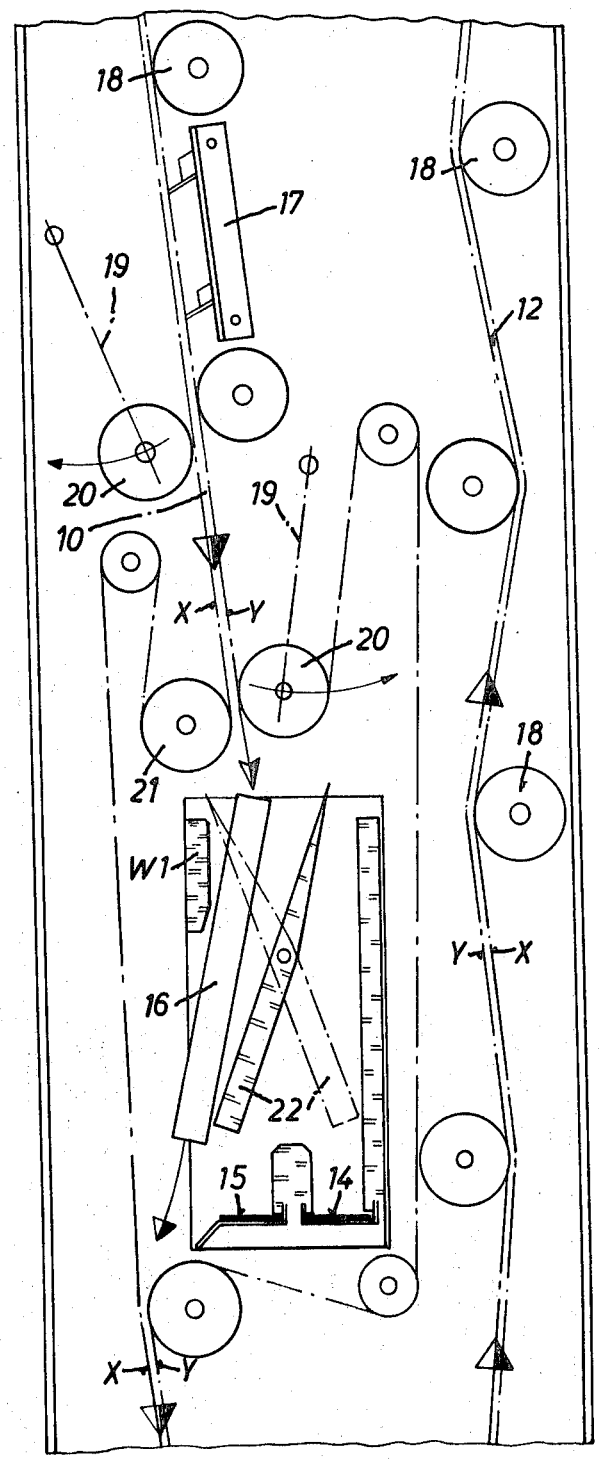

The device according to the invention is illustrated by way of an exemplary embodiment schematically in the drawing, wherein:

FIG. 1 shows an over-all arrangement of the conveyor paths in a line diagram together with the branching off positions; and FIG. 2 shows an intersection point in the case of the downward direction of a conveyor container.

In FIG. 1 of the exemplary embodiment, the horizontal paths, which constitute circular paths, are designated H1, H2, H3, H4 according to their association with the decks or stories. The vertical path is V. As a circular path it possesses a downward path 10, a bottom reversal 11, an upward path 12 and a top reversal 13. In the intersection regions of its downward path 10 with the horizontal paths, intersection points W1, W2, W3, W4 are present, which depending upon their selective adjustment, lock in a conveyor container coming from the top into the horizontal path, or permit it to continue to travel downwards. In front of the intersections — considered in the direction of travel, indicated by arrows, of the conveyor containers in the horizontal paths — customary branching off points A1, A2, A3, A4 are arranged. Depending upon their adjustment, they permit the conveyor containers arriving from the right hand side in a horizontal circular path to continue to travel straight ahead along the path section designated 14, or else they divert them into a path section 15, parallel therewith, which issues into the downward path 10 of the vertical path V.

The points illustrated in detail in FIG. 2 may be assumed to be that designated W1 in the horizontal path H1 according to FIG. 1. The conveyor container 16 is provided on one or on both of its wide sides with a destination address in the form of adjustable contact bridges, which are scanned along their transport paths by stationary scanning heads 17. Circuits are then completed in which control elements are contained.

Whereas the conveyor containers 16 are moved standing on edge along the horizontal paths H1 to H4 (FIG. 1) upon a single conveyor belt, of which the path section 14 is visible in the points W1 of FIG. 2, their transport along the vertical paths 10, 12 is effected in both directions between two conveyor belts X-Y driven at the same speed and in the same direction, which are maintained in their course by staggered guide rollers 18 and maintained in tension by weights.

Along the downward path between a scanning head 17 and the points W1, rollers 20 deflectable in arms 19 counter to springs, not shown, ensure that incoming conveyor containers 16 do not slip downwards uncontrolled between the conveyor belts X–Y. At the entrance to the points W1, rollers 20, 21 deflect the two conveyor belts X–Y away from each other around the points, and back together again beneath the latter.

The point W1 has incorporated in it a points tongue 22 which is deflectable by a control impulse derived from the destination address of an incoming conveyor container 16 into one or the other of two positions provided. The adjustment conforming to the tongue position illustrated by solid lines causes a conveyor container 16 which is released from the separated conveyor belts to be directed along the left hand side of the tongue downwards between the conveyor belts X–Y which are there closed together again, and after travelling through the bottom reversal point 11 (FIG. 1) to be transported upwards in the upward path 12. Conveyor containers which arrive along the horizontal path section 14 in the case of such a position of the tongue travel past the tongue 22 on its right hand side and continue horizontally.

When the tongue is adjusted into the position illustrated by phantom lines, a conveyor container arriving along the vertical path is guided along the right hand flank of the tongue with its lower end via the horizontal path section 14. After the tongue has been readjusted into the other position, which may be effected for example by the energy of impact of the locked in conveyor container upon the lower lever arm of the tongue, or by a control impulse tripped by the conveyor container, the conveyor container is transferred to the horizontal path section 14.

Now in case a conveyor container 16 is required to be guided from the horizontal circular path H1 through the branched path section 15 to the upward path in the vertical path V, the tongue 22 of the points W1 is likewise adjusted into the position shown by the phantom lines by a control impulse derived from the conveyor container. Then the conveyor container which arrives along the path section 15 can adopt a position beside the left hand flank of the points tongue in such a way that when the lower lever arm of the tongue returns into its position illustrated by the solid lines by the effect of a control impulse, the conveyor container is pushed by the lever arm towards the side to the entrance into the aperture of the conveyor belts X–Y which closes again in that position.

The possibility, on the one hand when the points tongue 22 is positioned for continuation of the conveyor containers in the existing direction, and on the other hand when the points tongue is positioned for diversion between the vertical path and a horizontal path, of being able to travel through the points simultaneously along all the respectively involved paths, is achieved by an appropriate matching of shapes and sizes. For example, measures such as a construction of the tongue as a double armed lever, the sharpening on one side of its upper lever arm, the dimensioning of the tongue and offsetting of its pivot axis with respect to the dimensions of the conveyor containers contribute to this aim.

It should also be mentioned in this connection, that in the case of a possible coincidence in time of the locking in of a conveyor container through the branch inlet 15 and the arrival of a conveyor container from the downward path 10, the latter container is carried around on a detour via the circular path H1.

In order to explain the operative principle of the over-all installation according to FIG. 1, it will be assumed that a conveyor container is required to be transported from the station ST1 in the horizontal circular path H1 to the station ST2 in the circular path H2 of the higher deck or story. In this case the path leads via the circular path H1 to the branching off points A1, from there via the branch inlet 15 into the downward path 10, then through the bottom reversal point 11 and in the upward path 12 as far as the top reversal point 13, then along the downward path 10 via the points W4 and W3 to the points W2 and from the latter directly to the controlled destination station ST2 in the circular path H2. During this process only the tongue of the point W2 is required to perform a movement, because all the other points within the vertical paths V may be adjusted permanently to through passage.

The above described transport path clearly shows the reductions compared to the distance which a conveyor container would have to travel in the case of the same transport conditions in the known installations initially described. There it would additionally have to travel through the horizontal circular paths H4 and H3 completely.

Having thus described my invention, I claim:

1. A conveyor assembly for transporting containers provided with destination addresses along horizontal and vertical paths comprising two or more horizontal conveyors, a vertical conveyor including a pair of belts operating at the same speed in close association with each other and arranged to receive containers therebetween and carry them therealong, a branch line in each of said horizontal conveyors having intersection with said vertical conveyor, and a points tongue at each intersection controlled by the destination address which permits selectively the continuation of containers along their vertical or horizontal paths or the direct diversion of the same from the vertical to the horizontal path and vice versa.

2. The conveyor assembly of claim 1 wherein the intersections are constructed in such a manner that in their switching position to continuation of the material along the vertical or horizontal paths may permit the simultaneous transport of the material along the vertical path and along the horizontal path within the intersection position.

3. The conveyor assembly of claim 1 wherein the intersections are constructed in such a manner that in their switching position to diversion of the material from the vertical to the horizontal path and vice versa they permit the simultaneous transfer of material from the vertical path to the horizontal path and from the additional branch inlet of the horizontal path to the vertical path.

4. The conveyor assembly of claim 1 wherein all the conveyor paths are provided in front of their entry into a points region with a scanning head for the destination addresses of the conveyor containers.

* * * * *